(12) United States Patent
Vaidyanathan

(10) Patent No.: US 6,606,541 B2
(45) Date of Patent: Aug. 12, 2003

(54) AUTOMATED SYSTEM FOR REPAIRING COMPONENTS

(75) Inventor: Janakiraman Vaidyanathan, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 191 days.

(21) Appl. No.: 09/845,143

(22) Filed: Apr. 30, 2001

(65) Prior Publication Data

US 2002/0161483 A1 Oct. 31, 2002

(51) Int. Cl.[7] .......................... G05B 13/00; B21D 58/78
(52) U.S. Cl. ........................ 700/275; 29/889.7
(58) Field of Search .................. 700/90, 169, 105, 700/170, 275; 451/64, 66, 80, 91, 98; 702/34–35; 356/241.5; 29/889, 889.1, 889.23, 889.7

(56) References Cited

U.S. PATENT DOCUMENTS

| | | | | |
|---|---|---|---|---|
| 4,050,133 A | * | 9/1977 | Cretella et al. | 148/527 |
| 4,866,828 A | * | 9/1989 | Fraser | 29/889.1 |
| 4,951,390 A | * | 8/1990 | Fraser et al. | 29/889.1 |
| 5,216,808 A | * | 6/1993 | Martus et al. | 29/889.1 |
| 5,956,845 A | * | 9/1999 | Arnold | 29/889.1 |
| 6,040,666 A | * | 3/2000 | Honda et al. | 700/275 |

* cited by examiner

Primary Examiner—Albert W. Paladini
Assistant Examiner—Walter R. Swindell
(74) Attorney, Agent, or Firm—Bachman & LaPointe, P.C.

(57) ABSTRACT

The present invention relates to an automated system and a process for repairing a component having at least one surface. The system broadly comprises a scanner device for generating an image of each component surface having a repair material thereon and a programmed central processing unit for generating instructions for performing an operation to remove any excess repair material from each surface of the component and to blend each surface of the component. The system further includes a programmable robot for holding the component during the scanning process and during the subsequent operation. The system further includes a cell having a plurality of tools for performing different blending operations and/or polishing surfaces of the component. A process for performing the repair of the component is also described.

26 Claims, 2 Drawing Sheets

AUTOMATED SYSTEM FOR REPAIRING COMPONENTS

BACKGROUND OF THE INVENTION

The present invention relates to an automated system and a process for repairing components such as turbine vanes.

Components in gas turbine engines are exposed to high temperatures and pressures for extended periods of time. A typical application is high pressure turbine vanes where the temperature of the component can rise to well over 2000° F. Under these conditions, the component is expected to retain its strength and shape long enough to provide economical operation of the engine without unduly frequent service or replacement requirements.

After extended service, some components incur damage due to erosion and fatigue-induced cracking. Eventually, these components need to be repaired or overhauled.

During overhaul, it is necessary to apply a pasty braze repair material over the airfoil surfaces and the platforms of the component to fill any cracks and all of the cooling holes that may be present in the component. Thereafter, the component is placed in a furnace to complete the brazing operation. Typically, there is excessive repair material left on the surfaces of the component, which repair material has to be removed and/or manually blended to return the component as close as possible to its original shape. The brazing materials used in this process have a high hardness, i.e. Rc 50 or greater, and very low machinability. Consequently, manual blending takes a long time to complete—an average of 60 to 75 minutes per vane. Only very skilled operators can do the manual blending consistently as the complex airfoil shape is blended back blindly as many surfaces are covered with the repair material. Further, the shape obtained is not accurate because of the limits of the manual operation.

The challenge here is that unlike normal part making where the component geometry is known and hence a constant blend path can be generated, here the repair component geometry changes from component to component. This is because the component has been in service on an engine for a long time in a high temperature environment. Due to the severe operating conditions, the components coming for overhaul or repair are normally distorted. This means that existing CAD geometry data cannot be used to create a standard blend path to blend all the components. The additional challenge here is that the outside airfoil geometry has to be blended consistent with the inside hollow geometry to maintain a designed amount of metal thickness because both the inside and the outside profiles are distorted by operating conditions. The repaired coated surface offers few original virgin surfaces for reference or tooling.

SUMMARY OF THE INVENTION

Accordingly, it is an object of the present invention to provide a system and a process for repairing components.

It is a further object of the present invention to provide a system and a process as above which reduces process time and labor cost.

It is still a further object of the present invention to provide a system and a process as above which produces a repaired component with enhanced quality.

It is yet a further object of the present invention to provide a system and a process as above in which the airfoil profile of the component is closer to the required form.

The foregoing objects are attained by the system and the process of the present invention.

In accordance with the present invention, a system for repairing a component is provided. The system broadly comprises means for generating instructions for performing an operation to remove any excess repair material from each surface of a component being repaired and to blend the repaired surfaces, and automated means for performing the blending operation in accordance with the generated instructions. The system further includes means for generating an image of each component surface having repair material thereon which requires removal and/or blending.

Further in accordance with the present invention, a process for repairing a component is provided. The process broadly comprises the steps of generating instructions for performing an operation to remove excess repair material from each surface of the component being repaired and to blend the repaired surfaces and performing the blending operation in accordance with the generated instructions.

Other details of the system and the process of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

As discussed above, components 16 to be repaired first have a braze or repair material applied to them. The braze material is applied wherever a crack is found and wherever it is necessary to reconstruct a portion of the component 16. Typically, the braze material is applied to the airfoil surface portions, the leading and trailing edges, and the platform portions of each component 16. After the braze material has been applied, the component 16 is placed into a brazing furnace to complete the brazing operation. Following brazing, it becomes necessary to remove any excess braze material and to blend the remaining braze material into the component so that the refurbished component is as close as possible to its original shape.

Figure 1:
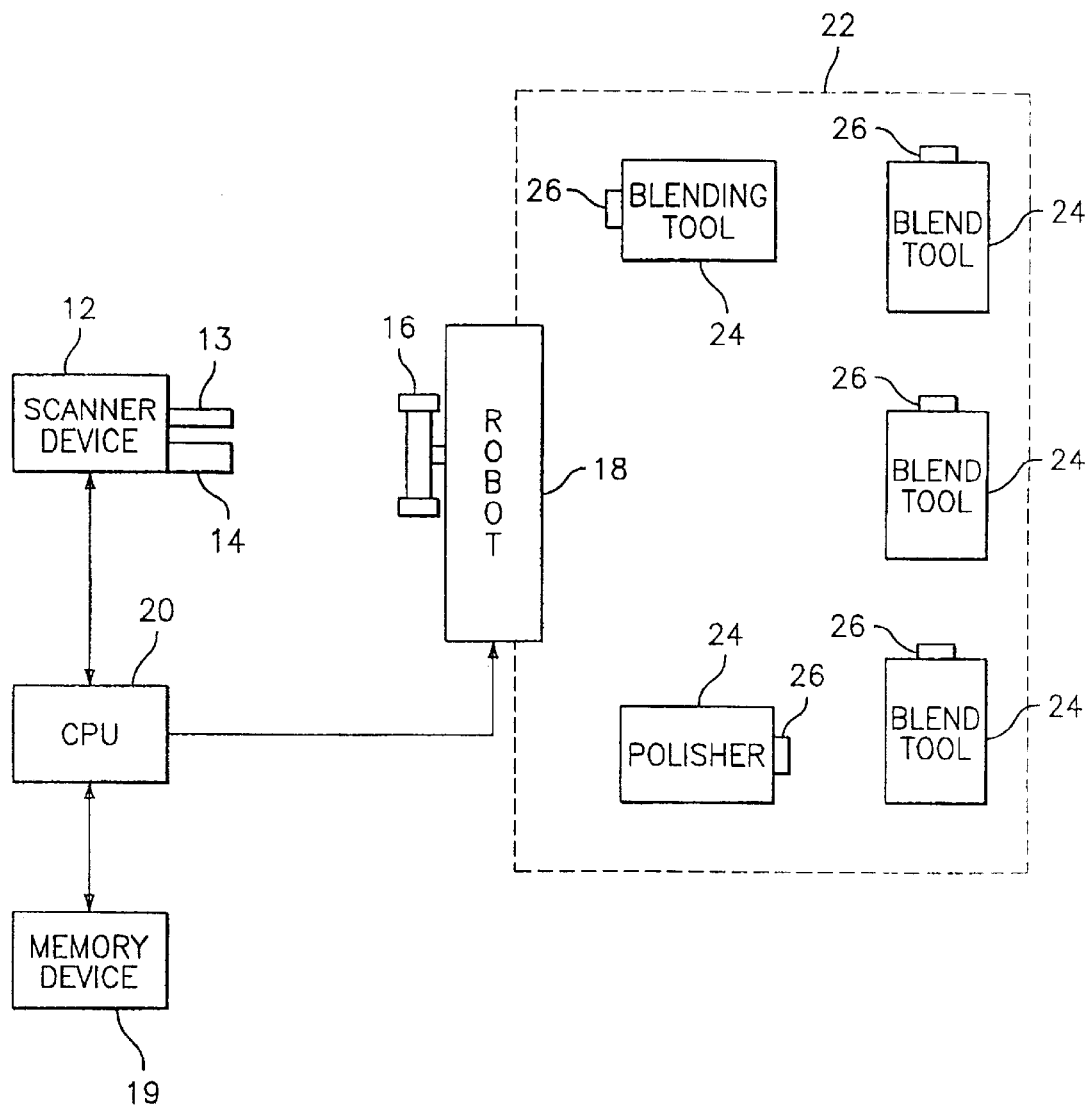
FIG. 1 is a schematic representation of a system for repairing components in accordance with the present invention.

Referring now to the drawings, a system 10 for overhauling, refurbishing, or repairing components 16, such as first stage vanes on a gas turbine engine, is illustrated in FIG. 1. The system 10 is designed to automate that portion of the repair operation requiring blending and/or removal of braze or repair material deposited on the component 16.

The system 10 first obtains an image of the component 16 with the brazing material on it. To this end, the system 10 includes a scanning device 12 for obtaining a digital image of each surface of the component 16 on which the braze material has been deposited. The image is taken by the scanning device 12 from multiple angles so as to cover the full surface area of the component 16. The scanning device 12 may comprise a laser 13 for illuminating each component surface having brazing material thereon. The laser 13 illuminates each respective surface with a plurality of lines or stripes. The scanning device 12 further has at least one camera 14, for capturing an image of each respective surface with the multiple stripes thereon. To enable the scanning device 12 to capture images of all of the surfaces of the component 16, the component 16 is mounted on a programmable robot 18, such as a programmable six axis robot. The robot 18 is used to move the component 16 so that the scanning device obtains the desired images.

When the scanning operation is completed, the scanning device 12 provides three-dimensional point cloud digital images of each component surface to a central processing unit 20. In this way, the scanning device 12 provides information about the current form of the component 16 as point clouds.

The programmed central processing unit 20 receives the digital image data from the scanning device 12. The central processing unit 20 is preferably programmed to check the integrity of the received digital image data and to delete any unnecessary point clouds. Still further, the central processing unit 20 is programmed to integrate the digital image data from the various views of each component surface so as to combine the data in the right sequence to obtain full three dimensional digital data of the whole component surface. In this way, the central processing unit 20 creates a three dimensional image of the component 16 as it is with the brazing material on respective surfaces thereof.

Figure 2:
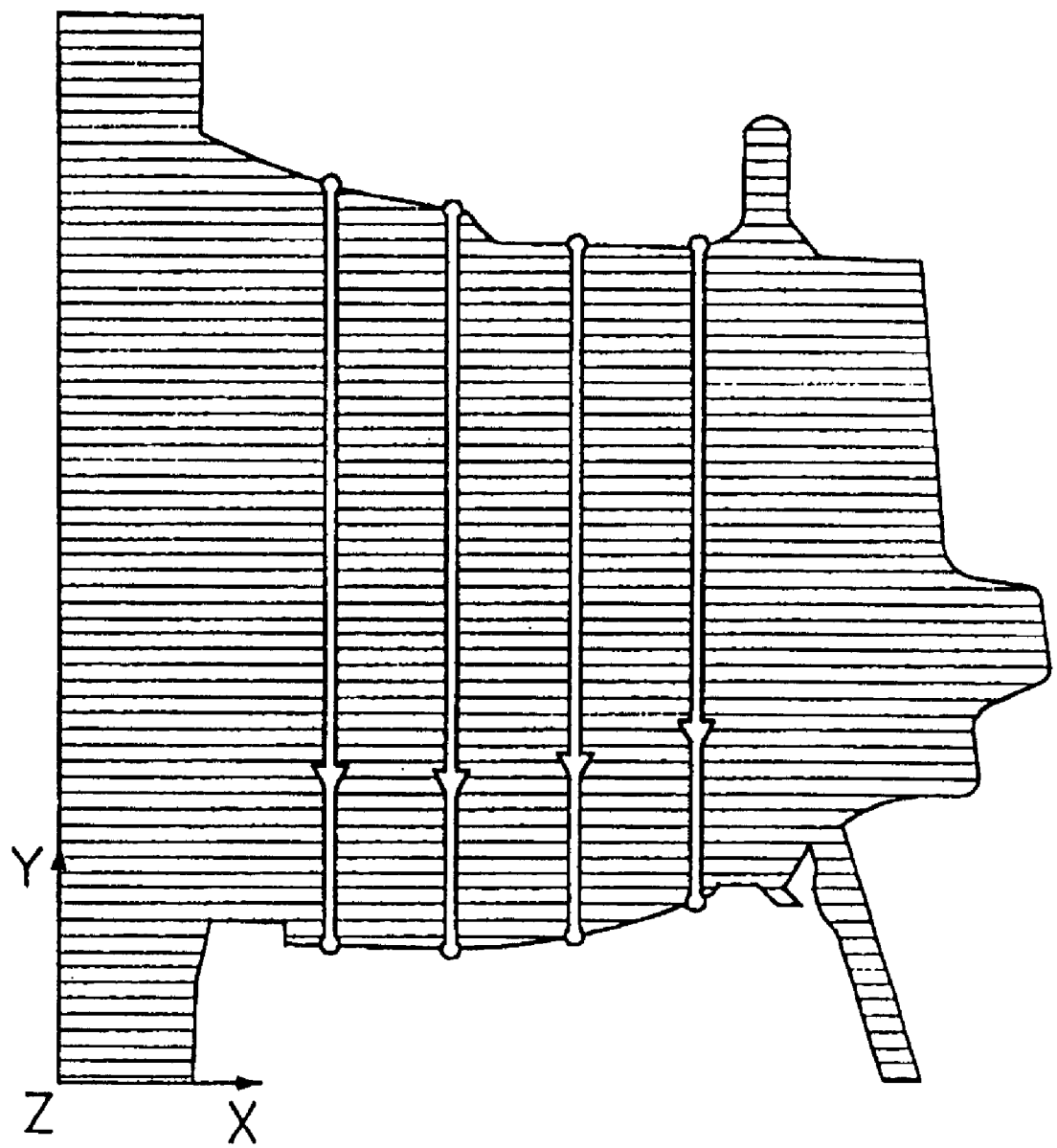
FIG. 2 illustrates a blending program for a vane to be repaired.

The central processing unit 20 is further programmed to compare the three dimensional digital data representative of each whole component surface with its nominal or original shape. Information about the nominal or original shape of each surface of a particular component being repaired can be stored in a memory device 19 associated with the central processing unit 20 or may be inputted by a user into the central processing unit 20 using any suitable input device known in the art. From this comparison, the central processing unit 20 creates a blending path program for each surface having braze material thereon which must be removed and/or blended on the component 16. The blending path program thus created is supplied to the robot 18 so that the robot 18 can manipulate the orientation of each component 16 with respect to a series of blending tools which will be used later on to complete the overhaul or repair process. FIG. 2 illustrates one such blending path program for one surface of a turbine vane to be repaired.

Further, the central processing unit 20 can provide an operator with a visual image of the brazing material which needs to be removed. Such an image can be generated by subtracting the nominal shape of each surface of the component from the scanned shape of the component 16 taken by the scanning device 12.

The central processing unit 20 may comprise any suitable computer known in the art and may be programmed in any suitable programming language.

As mentioned before, the robot 18 is preferably a programmable six axis robot for holding the component 16 and moving the component 16 about any of the six axes. The robot 18 continuously articulates and moves the component 16 along a programmed path with respect to a set of tools while preferably remaining in a stationary location itself.

The system 10 further includes a blending cell 22 consisting of multiple tool stations 24 for blending the component 16 using various compliant tools. The cell 22 is designed so that blending proceeds in stages with each station in the cell specializing in blending one feature of the component. The number of tool stations 24 in the blending cell 22 and the type of tool at each station are a function of the component 16 being repaired. For example, if the component 16 is a first stage turbine vane, then the cell 22 may include tools for blending such features as the concave airfoil shaped surface of the vane, the convex airfoil shaped surface of the vane, the leading edge of the vane, the trailing edge of the vane, the platform(s) of the vane. An additional tool which may be incorporated into the cell 22, if desired, may be a polisher for polishing the surfaces of the component 16 after completion of the blending stages.

The blending cell 22 is designed to use a compliant approach where the load on a particular blend area of a respective surface of the component 16 is maintained constant. This is done through the use of load sensors 26 on each tool and through the design of the tools themselves. Each load sensor 26 detects the amount of force being applied by a respective tool to a particular blend area on a respective surface of the component 16 being worked upon. The load sensor 26 sends a signal to the respective tool to adjust the tool and the force being applied by the tool to the particular blend area if the load being applied is not at a desired level.

After a particular blending and/or polishing operation has been completed, it is desirable to inspect the surfaces of the component 16 which have been worked on and repaired. While it is possible to provide a separate inspection device, it is preferred that the scanning device 12 be used as a periodic inspection tool to monitor the progress of the blending process.

As can be seen from the foregoing, an automated system and process for repairing, refurbishing, or overhauling components has been described. The process and system are adaptable so that they can be used in the refurbishment of a wide variety of components which have been subjected to a brazing repair technique. Still further, components may be refurbished using the process and the system of the present invention more rapidly and more economically.

It is apparent that there has been provided in accordance with the present invention an automated system for repairing components which fully satisfies the objects, means and advantages set forth hereinbefore. While the present invention has been described in the context of specific embodiments thereof, other variations, alternatives, and modifications will become apparent to those skilled in the art having read the foregoing description. Therefore, it is intended to embrace those variations, alternatives, and modifications which fall within the broad scope of the appended claims.

What is claimed is:

1. A system for repairing a component having at least one surface on which a repair material has been deposited comprising:

means for generating instructions for performing an operation to remove any excess repair material from each said surface and to blend said surface of said component; and automated means for performing said operation in accordance with said generated instructions.

2. A system according to claim 1, further comprising means for generating an image of each said surface on which said repair material has been deposited.

3. A system according to claim 2, wherein said image generating means comprising a scanner device.

4. A system according to claim 3, wherein said scanner device has a laser for generating multiple laser stripes on an individual surface of said component and at least one camera for capturing an image of said individual surface being illuminated by said laser stripes.

5. A system according to claim 2, wherein said image generating means generates a digitized image of each said surface where said repair material has been deposited.

6. A system according to claim 5, wherein said instruction generating means comprises means for comparing said digitized image of each said surface with a nominal image for each said surface and creating blend path as per said comparison.

7. A system according to claim 6, wherein said instruction generating means generates a blending path program for performing said operation.

8. A system according to claim 7, wherein said automated means comprises a programmable robot for holding said component during said image generating and said operation and wherein said programmable robot receives said blending path program.

9. A system according to claim 8, wherein said robot comprises a programmable six axis robot.

10. A system according to claim 8, wherein said automated means further comprises a cell having at least one tool station having a tool for performing a blending operation.

11. A system according to claim 10, wherein said cell has a plurality of tools for working on different ones of said surfaces of said component.

12. A system according to claim 11, wherein each said tool has a sensor connected thereto for insuring that said tool applies a constant force to a respective blend area on a respective surface of said component.

13. A system according to claim 11, wherein one of said tools comprises a polisher.

14. A system according to claim 2, further comprising means for inspecting said component after said operation has been completed.

15. A system according to claim 14, wherein said inspecting means is said image generating means.

16. A process for repairing a component having at least one surface on which a repair material has been deposited comprising the steps of:
   generating instructions for performing an operation to remove any excess repair material from each said surface of said component and to blend each said surface; and
   performing said operation in accordance with said generated instructions.

17. A process according to claim 16, further comprising generating an image of each said surface having said repair material deposited thereon.

18. A process according to claim 17, wherein said image generating step comprises generating a digitized image of each said surface.

19. A process according to claim 18, wherein said instruction generating step comprises comparing said digitized image for each said surface with a nominal image for each said surface.

20. A process according to claim 19, wherein said instruction generating step comprises generating a blending path program for performing said operation.

21. A process according to claim 20, further comprising:
   providing a programmable robot for manipulating said component during said operation; and
   transmitting said blending path program to said programmable robot.

22. A process according to claim 21, wherein said robot providing step comprises providing a programmable six axis robot.

23. A process according to claim 21, further comprising:
   providing at least one tool for performing said operation; and
   said performing step comprising moving a respective surface of said component into contact with said tool using said robot.

24. A process according to claim 23, wherein:
   said tool providing step comprises providing a plurality of tools; and
   said performing step comprising moving respective surfaces of said component into contact with each of said tools in a staged operation.

25. A process according to claim 23, wherein said performing step comprises polishing at least one surface of said component.

26. A process according to claim 23, further comprising intermittently inspecting said component during said operation.

* * * * *